United States Patent
Dolan et al.

(10) Patent No.: US 10,548,139 B1
(45) Date of Patent: Jan. 28, 2020

(54) MULTI-SCREEN VIRTUAL BILLBOARD

(71) Applicant: CSC Holdings, LLC, Bethpage, NY (US)

(72) Inventors: James Dolan, Oyster Bay, NY (US); Wilton J. Hildenbrand, Smithtown, NY (US); Patrick J. Donoghue, Sea Cliff, NY (US)

(73) Assignee: CSC Holdings LLC, Bethpage, NY (US)

( * ) Notice: Subject to any disclaimer, the term of this patent is extended or adjusted under 35 U.S.C. 154(b) by 78 days.

(21) Appl. No.: 15/270,406

(22) Filed: Sep. 20, 2016

Related U.S. Application Data (63) Continuation of application No. 13/862,897, filed on Apr. 15, 2013, now Pat. No. 9,466,257.

(60) Provisional application No. 61/716,061, filed on Oct. 19, 2012.

(51) Int. Cl.
*H04W 72/04* (2009.01)
*H04W 64/00* (2009.01)
*H04W 8/00* (2009.01)
*H04W 4/80* (2018.01)

(52) U.S. Cl.
CPC .......... *H04W 72/048* (2013.01); *H04W 4/80* (2018.02); *H04W 8/005* (2013.01); *H04W 64/00* (2013.01)

(58) Field of Classification Search
CPC ... H04W 72/048; H04W 4/008; H04W 8/005; H04W 64/00
See application file for complete search history.

(56) References Cited

U.S. PATENT DOCUMENTS

| | | | |
|---|---|---|---|
| 6,501,441 B1 * | 12/2002 | Ludtke | G06F 3/1446 345/1.1 |
| 2003/0017823 A1 * | 1/2003 | Mager | H04M 1/22 455/414.1 |
| 2003/0146891 A1 | 8/2003 | Poliakine | |
| 2012/0055983 A1 | 3/2012 | Wellborn et al. | |
| 2013/0138518 A1 * | 5/2013 | White | G06Q 20/204 705/16 |
| 2014/0039945 A1 | 2/2014 | Coady et al. | |
| 2014/0113598 A1 * | 4/2014 | Conti | G06F 3/1446 455/414.1 |

* cited by examiner

*Primary Examiner* — Charles V Hicks
(74) *Attorney, Agent, or Firm* — Sterne, Kessler, Goldstein & Fox P.L.L.C.

(57) ABSTRACT

A system, method, and computer program product are provided for the display of a multi-screen virtual billboard. The virtual billboard utilizes individual mobile devices as portions of a display screen (e.g., as individual pixels or groups of pixels). Each mobile device is configured to display a portion of the virtual billboard corresponding to a location of the mobile device. The mobile devices forming the virtual billboard are triggered in order to display a graphic or other visual information in synchronization with the other mobile devices.

20 Claims, 6 Drawing Sheets

MULTI-SCREEN VIRTUAL BILLBOARD

CROSS-REFERENCE TO RELATED APPLICATIONS

This application claims the benefit under 35 U.S.C. § 119(e) of U.S. Provisional Patent Application No. 61/716,061, filed Oct. 19, 2012, entitled "Multi-Screen Virtual Billboard," which is incorporated herein by reference in its entirety.

BACKGROUND OF INVENTION

Field of the Invention

The present invention relates generally to mobile devices and, more particularly, to synchronization of graphical displays on mobile devices.

Description of the Background Art

Today, most individuals carry some form of mobile device having a graphical display screen on their person. Many of these mobile devices have significant capabilities, including the ability to display high resolution color images and full motion video, as well as the ability to perform computationally intensive processing.

Given the ubiquitous nature of these devices, application developers have sought to improve the spectator experience at events, such as sporting events, concerts, etc. by providing applications that showcase additional information regarding the event live during the event. Similarly, at many concerts, spectators are encouraged to submit messages using their devices in order to have the messages appear on a central display.

Accordingly, what is desired is a novel approach to spectator participation using the graphical capabilities of ubiquitous mobile devices.

SUMMARY OF INVENTION

Embodiments of the invention include methods, systems, and computer program products for receiving a location of a mobile device, providing, to the mobile device, display data comprising a portion of a graphical element corresponding to the location of the mobile device, and triggering display of the display data by the mobile device in synchronization with display of additional display data by an additional mobile device.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the present invention.

Reference to modules in this specification and the claims means any combination of hardware or software components for performing the indicated function. A module need not be a rigidly defined entity, such that several modules may overlap hardware and software components in functionality. For example, a software module may refer to a single line of code within a procedure, the procedure itself being a separate software module. One skilled in the relevant arts will understand that the functionality of modules may be defined in accordance with a number of stylistic or performance-optimizing techniques, for example.

In order to increase spectator engagement and participation at an event, a spectator-powered virtual billboard is described. This is accomplished, by way of non-limiting example and as described further herein, by sending a sequence of images to available smart phones, tablets, and other mobile devices with graphical displays. These devices are treated as individual pixels or groups of pixels within a larger virtual billboard.

To accomplish this, certain challenges must be met. For example, the location of the mobile device within the virtual billboard needs to be determined in order to provide the mobile device with the corresponding portion of the virtual billboard display. The various capabilities of the mobile devices need to be taken into account, including providing options for simpler operations (e.g., single color sequences) for basic mobile devices, to more complex operations (e.g., synchronized full-motion video) for advanced mobile devices. Additionally, in order for the correct graphical data to be shown at the proper time, a synchronization mechanism is described that allows synchronization of a large number of devices (e.g., 20,000 devices in an arena), operating across disparate hardware, software, and telephony network implementations.

Figure 1:
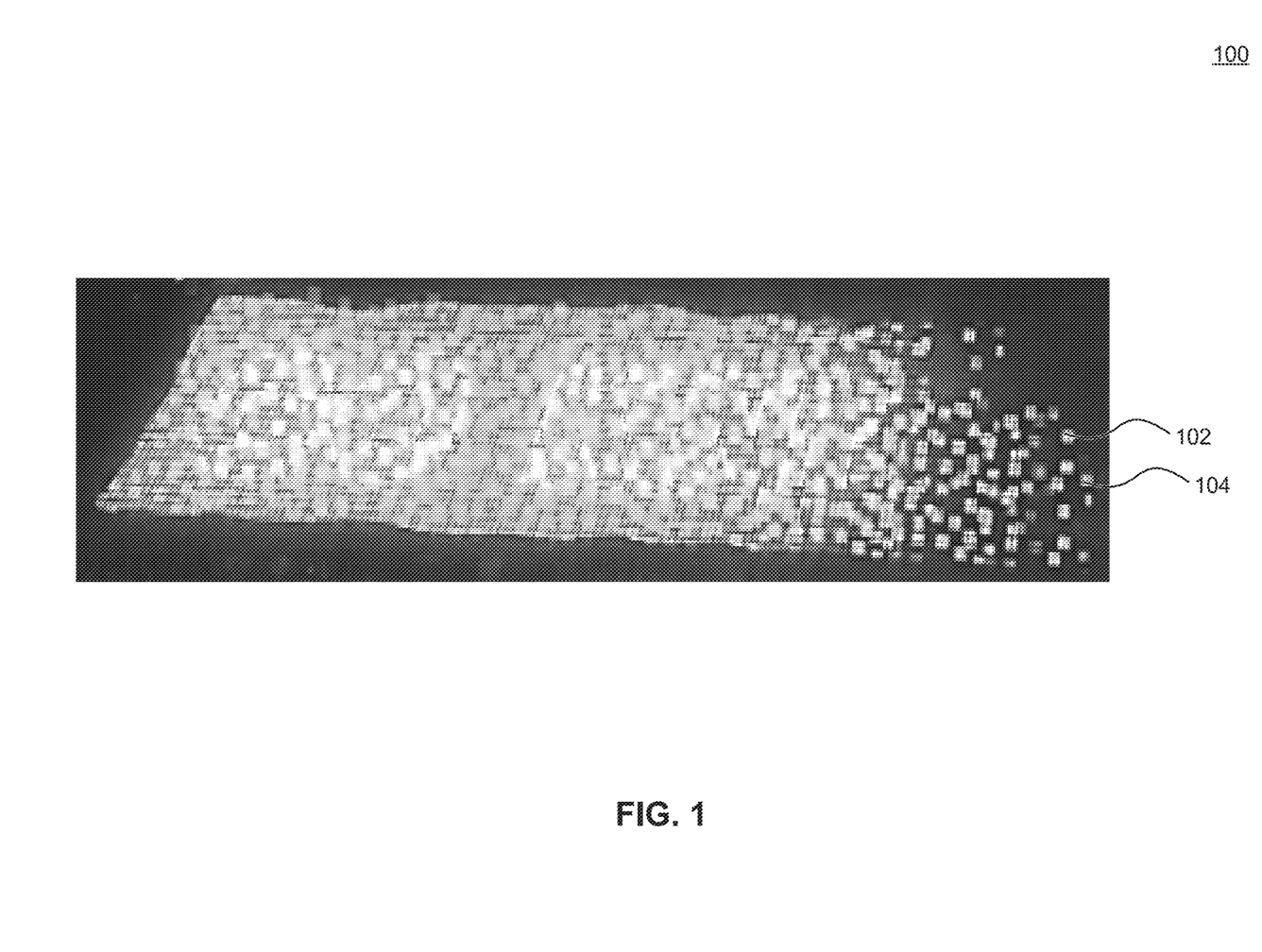
FIG. 1 is a virtual billboard in accordance with an embodiment of the present invention.

FIG. 1 is a virtual billboard 100 in accordance with an embodiment of the present invention. Spectators, such as spectators at a sporting event, have corresponding devices such as devices 102 and 104 at the event. During the event, the spectators hold up their devices, causing the cluster of devices as shown in virtual billboard 100 to render a combined graphical display.

For example, at a predetermined time, spectators may be asked to hold out their mobile devices (such as mobile phones or tablets) with the display facing into the arena or other facility. The displays are then each instructed to display a corresponding portion of a graphic. Details regarding how this instruction is provided, and how the corresponding portion of the graphic is determined, are provided below.

Example uses of this combined graphical display can be to show a static image, such as a team logo, or an animation. The animation may include a preprogrammed pattern, such as a "wave" effect (e.g., a sweeping color across the stands), or a sequence of graphics to render a video. One skilled in the relevant arts will appreciate that the techniques disclosed herein can be utilized to develop any number of display variations, and such variations are contemplated within the scope of this disclosure.

II. Client Application

In order to create the virtual billboard, it is necessary to control the individual elements of this virtual display (the individual mobile phones, tablets, etc.) in order to display the correct graphic at a correct moment in time. This control is accomplished through the use of a client application operating on the mobile device.

In order for the mobile device to display the correct corresponding portion of the graphic at the correct moment in time, the location of the mobile device is obtained. This allows information concerning the portion of the virtual display that is to be presented at the location of the mobile device to be passed to the mobile device for control thereof.

Figure 2:
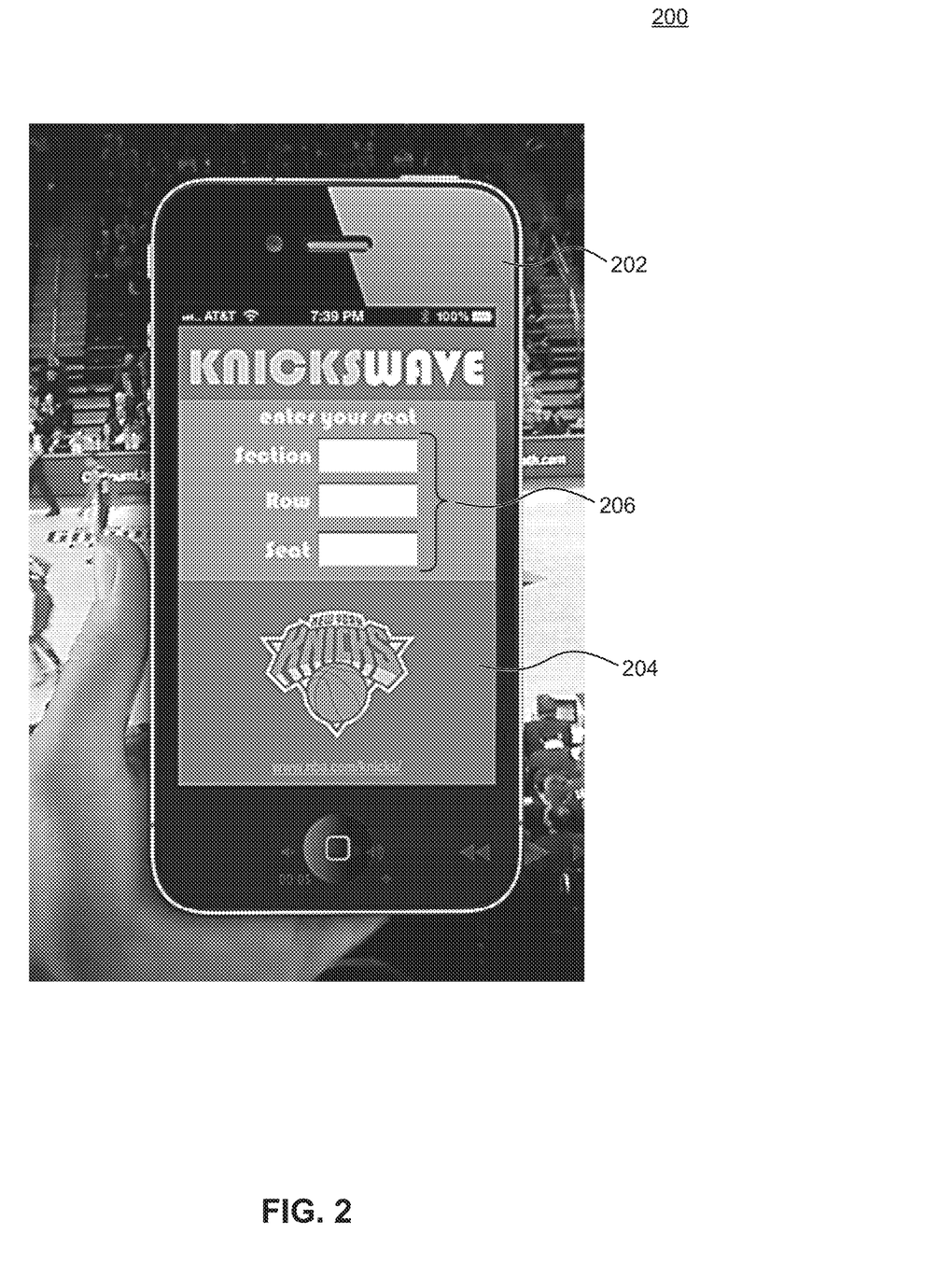
FIG. 2 illustrates an exemplary client environment, in accordance with an embodiment of the present invention.

In accordance with an embodiment of the present invention, identifying the location of the mobile device is accomplished through the use of a dedicated client application, or "app," installed on the mobile device. One skilled in the relevant arts will recognize that other techniques for operation of the mobile device can be utilized, such as through the use of a web page, hardware module attached to the mobile device, or other hardware or software component that permits operation in the exemplary manner described herein. FIG. 2 illustrates an exemplary client environment 200, in accordance with an embodiment of the present invention. As shown in FIG. 2, a mobile device 202 executes an application 204 that allows input regarding a location of the mobile device 202. As shown in the example in FIG. 2, location input is requested by way of seat entry 206.

By entering the seating location corresponding to the location of the mobile device, information concerning the corresponding portion of the virtual billboard can be provided to the application executing on the mobile device in order for the mobile device to operate as a respective portion of the virtual billboard. FIG. 2 illustrates an exemplary method for entry of position information, and one skilled in the relevant arts will appreciate that other techniques may be utilized within the scope of this disclosure. For example, seat information may be entered manually as shown in FIG. 2, by scanning of a code (e.g., bar code or Quick Response ("QR") code) on a ticket, or by scanning a code (e.g., bar code or QR code) on a seat. Additionally, the application may also provide facilities for purchasing or storing an electronic ticket ("eTicket"), and may provide information regarding seating directly to the virtual billboard portion of the application, or across applications providing these separate functions. With the growing prevalence of near field communication ("NFC"), NFC-enabled devices can obtain position information by communicating with, for example, a contactless NFC device embedded in the seat or elsewhere in the arena. Alternatively, NFC-enabled devices can communicate with other nearby NFC-enabled devices to determine relative positions.

Moreover, position information need not be associated with a particular seat at a venue. For example, global positioning system ("GPS") data, particularly GPS data augmented by additional positioning data known by a mobile device in order to increase accuracy, can likewise be used in certain applications, such as large outdoor venues. One skilled in the relevant arts will also recognize that the virtual billboard can be utilized in other gatherings of mobile devices, both large- and small-scale, and is not limited to the sporting venues described herein.

Figure 3:
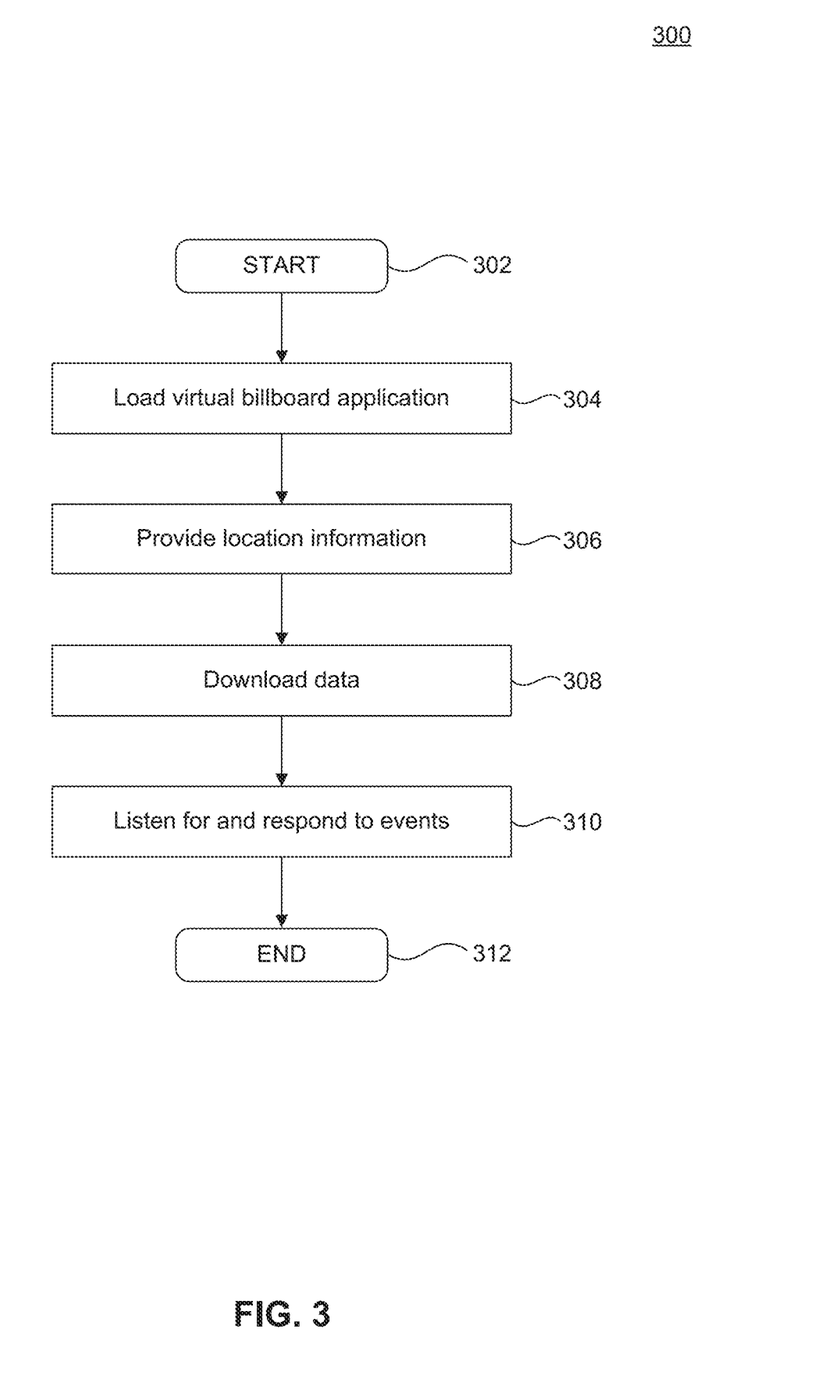
FIG. 3 is a flowchart illustrating configuration of a mobile device, in accordance with an embodiment of the present invention.

FIG. 3 is a flowchart 300 illustrating configuration of the mobile device, in accordance with an embodiment of the present invention. The method begins at step 302 and proceeds to step 304, where a virtual billboard application is loaded onto the mobile device. This application need not strictly be a native application, but may include web pages for instructing a web browser to perform the functions herein, or other software or hardware for performing the described functionality.

At step 306, the mobile device, via its virtual billboard application, provides location information to a virtual billboard service, in accordance with an embodiment of the present invention. This virtual billboard service is typically operated in concert with an associated facility in which the virtual billboard application is to be used, but one skilled in the relevant arts will appreciate that the data described herein can be provided to the mobile device and to the virtual billboard application as a local service.

In a typical application, however, a user of the virtual billboard application will provide the location information to a remote server, either before arriving at the venue (e.g., using the expected seating information from a ticket) or once at the venue (e.g., using a QR code affixed to the seat, or GPS positioning information). Once the position information for the mobile device is provided, the virtual billboard application will obtain data 308 regarding the graphical information to be displayed, in accordance with an embodiment of the present invention.

The data obtained at step 308 may include any number of components depending on the particular application, as will be recognized by one skilled in the relevant arts. For example, the data may include static graphics or full-motion video to be displayed by the mobile device at particular intervals. These graphics or video may be a portion of an entire graphic or video that, composited with graphics or video shown by other mobile devices, would provide the appearance of a larger multi-screen billboard.

Additionally, the data obtained at step 308 may include programmatic graphical display information. For example, the data may include a sequence of events for later playback, such as an instruction to display a particular color value for a time period, a second instruction to display a second color value for a second time period, a third instruction to fade to a third color value for a third time period, and so on. One skilled in the relevant arts will appreciate that any set of data that instructs the mobile device to display an image is contemplated within the scope of this disclosure.

With the display data from step 308, corresponding to the location from step 306, obtained in the mobile device and available to the virtual billboard application, the method proceeds to step 310 to listen for and respond to events. The operation of these events is described in further detail below. The method then ends at step 312.

In accordance with an embodiment of the present invention, the virtual billboard application (or a separate application running on the mobile device) can be configured to playback sound on the mobile device by the aforementioned triggering mechanisms.

III. Virtual Billboard Service

Figure 4:
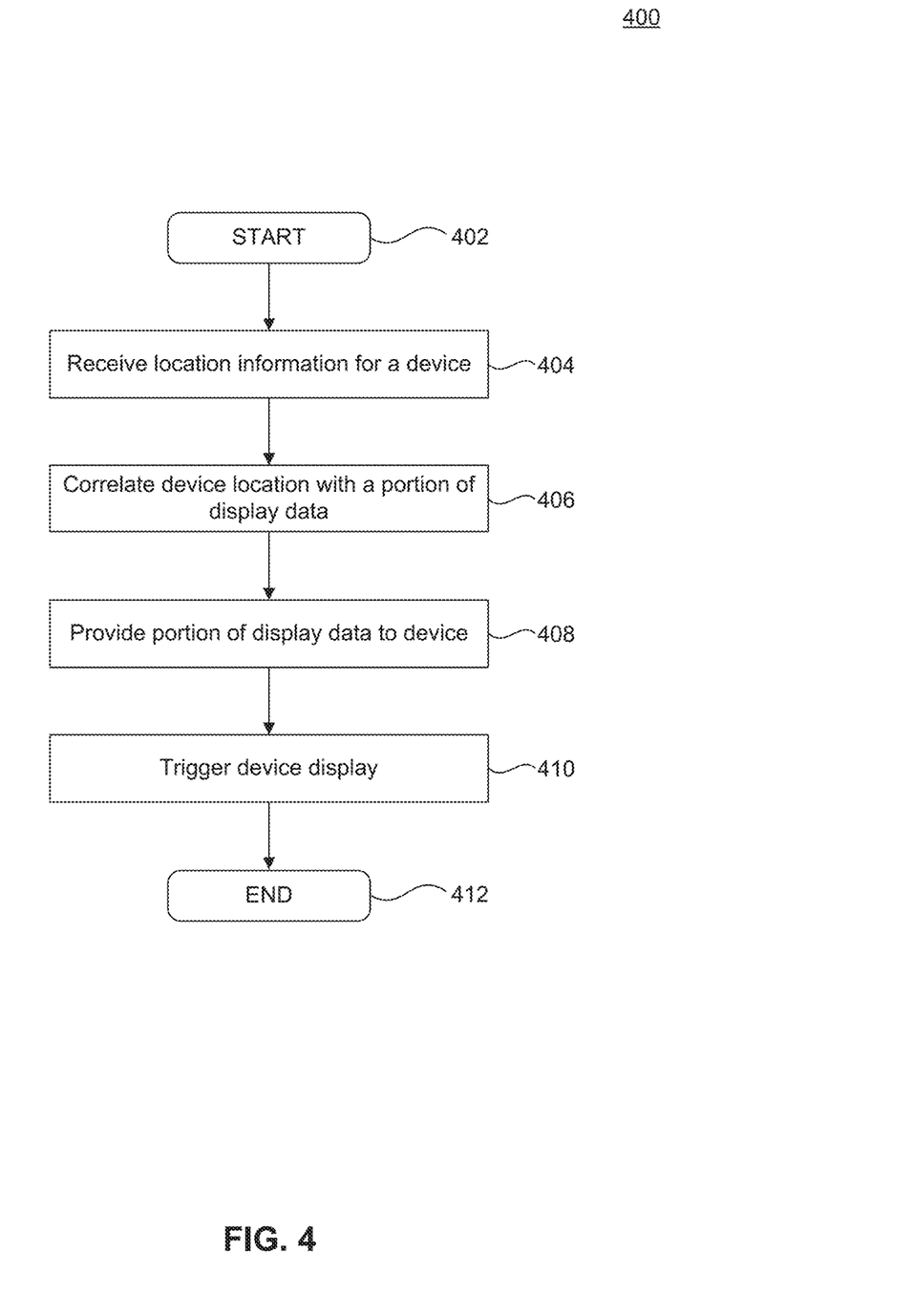
FIG. 4 is a flowchart illustrating operation of a virtual billboard service, in accordance with an embodiment of the present invention.

FIG. 4 is a flowchart 400 illustrating operation of a virtual billboard service, in accordance with an embodiment of the present invention. The virtual billboard service provides data to a mobile device to allow the mobile device to display a corresponding portion of a virtual billboard.

The method begins at step 402 and proceeds to step 404 where location information for a particular device is received, in accordance with an embodiment of the present invention. As previously described, this location information may correspond to a particular seat within a venue, to coordinate information provided by GPS, or to any other position information as would be understood by one skilled in the relevant art.

In accordance with an embodiment of the present invention, the virtual billboard service can provide a number of administrative tools to allow for real-time visualization and control over the mobile devices via the virtual billboard application. In particular, an administrative tool provides the ability to map the location of each connected mobile device to a virtual floor plan of the venue, in accordance with an embodiment of the present invention.

The virtual billboard service then correlates the device location from step 404 with a portion of a full display at step 406, in accordance with an embodiment of the present invention. For example, the virtual billboard service may utilize the mobile devices to, in concert, display a team logo. The team logo may be subdivided into individual portions of display data to be shown at a particular location, and therefore at the corresponding mobile device at that location. This portion of display data is then provided to the mobile device at step 408. As described above, the portion of display data may include, by way of non-limiting example, static graphics, full-motion video, or programmatic graphical display information.

With the display data from step 408, as correlated to the location from step 404 by step 406, provided to the mobile device and available to the virtual billboard application executing on the mobile device, the method proceeds to step 410 to trigger display of this display data. The operation of these event triggers is described in further detail below. The method then ends at step 412.

IV. Triggering of Mobile Devices

In accordance with an embodiment of the present invention, relevant data is preloaded into each mobile device based on the position of the mobile device. As previously described, the relevant data may include static graphics, full-motion video, programmatic graphical display information, or other information for controlling a display of the mobile device. This data is generally preloaded in order to improve responsiveness of the device when the data is to be displayed, and to reduce loads on cellular or wi-fi networks within a confined venue. However, with the appropriate infrastructure as will be appreciated by one skilled in the relevant arts, an additional embodiment of the present invention permits real-time access to graphical data.

When displaying the individual portions of display data on the mobile devices in order to form a complete virtual billboard, the timing of this display contributes to certain effects. For example, if the mobile devices are to be instructed to simply display a static image, timing requirements may be more relaxed and permit slower mobile devices to show their portion of the image several milliseconds after a faster mobile device would, with the assumption that the complete image will nevertheless appear momentarily.

However, more advanced effects (e.g., fade or wave effects) require precise timing across multiple mobile devices. This is complicated by the vast number of hardware, software, and network configurations utilized by mobile device subscribers. Hardware variations may include form factor (e.g., cell phone, tablet, etc.) and processing capabilities. Software variations may include the operating system (e.g., iOS by Apple Inc. of Cupertino, Calif., or Android by Google Inc. of Mountain View, Calif.) and the access to certain hardware features by a software application. Network variations may include a particular cellular communication provider or a wireless network.

The net effect of these significant variations is that timing is handled differently by each device, and no conforming configuration can be assumed. Moreover, there is no guarantee that the various mobile devices will be natively operating off of a common clock, and even mobile devices within a same wireless network theoretically synchronized to a common network clock may experience drift.

Given these variations, administrators should account for a minimum accuracy in timing when designing a display. For example, if the system can trigger 20,000 mobile devices at an accuracy of 100 ms, displays that would not present a clearly resolvable virtual billboard image at that potential latency should not be utilized.

One solution to the timing variability is to introduce a common clock that the virtual billboard application, deployed on each participating mobile device, can synchronize to, in accordance with an embodiment of the present invention. This approach is subject to variable drift across each device, which would need to be compensated for.

In a further embodiment of the present invention, the common clock is not deployed as a traditional timestamp, but rather implied through the use of an external stimulus. For example, music playback on an arena public address ("PA") system can be detected by a microphone on a mobile device and used as a synchronization source, or to trigger a particular sequence of graphical displays on the mobile devices. In an additional embodiment, the external stimulus can be used together with the common clock approach in order to synchronize the mobile devices and compensate for clock drift.

Additionally, a triggering mechanism, described in further detail below, can be used to initialize some behavior of the mobile devices. By way of non-limiting example, this behavior can include the display of an image or sequence of images on the mobile devices, in accordance with an embodiment of the present invention. This triggering mechanism can be used together with an aforementioned synchronization mechanism, or independently based on the assumption of receipt by the mobile device within an expected timeframe, to display the image or the sequence of images at specific times.

The triggering mechanism may be based on a location of the mobile device, and may be provided as a unique trigger to the mobile device on this basis. Alternatively, the triggering mechanism may be a common trigger for all mobile devices, to which a delay is introduced by the mobile device based on the location of the mobile device.

By way of non-limiting example, an administrator may wish to show a ring of blue rising from the floor of a venue, such as Madison Square Garden, up to the top rows of the stands. In one approach, the mobile devices located at the first row can be signaled to display blue for 100 ms, and then separate signals sent to each of the devices located at the subsequent rows to display blue for 100 ms. In contrast, using another exemplary non-limiting approach, each mobile device may be pre-programmed with an understanding of the "ring of blue" display pattern. Specifically, the mobile devices all receive a single common trigger signal and, based on the position (e.g., row) associated with the mobile device, the mobile device will introduce a delay prior to showing the blue display. In the aforementioned example, mobile devices located at the first row may not have any delay before showing blue, whereas mobile devices located at the second row may introduce a 50 ms delay before showing blue, and mobile devices located at the third row may introduce a 100 ms delay before showing blue.

V. Building a Virtual Billboard

Figure 5:
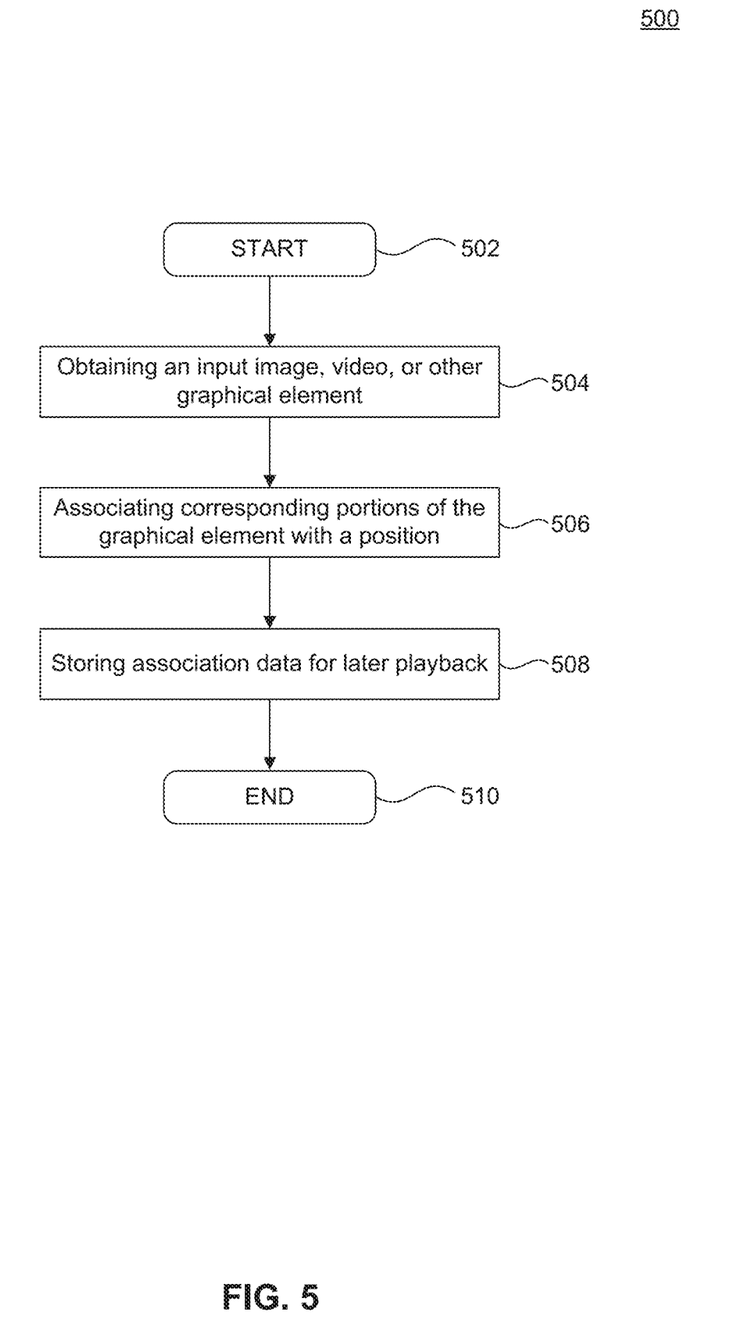
FIG. 5 is a flowchart illustrating steps for the operation of a virtual billboard administrative tool, in accordance with an embodiment of the present invention.

Given the timing complexities and difficulty in visualizing the effects, an embodiment of the present invention includes an administrative tool that allows an administrator to design, develop, and visualize a virtual billboard. FIG. 5 is a flowchart 500 illustrating steps for the operation of a virtual billboard administrative tool, in accordance with an embodiment of the present invention.

The method begins at step 502 and proceeds to step 504 where an input image, video, or other graphical element is obtained. This graphical element can be as simple as a single color, or as complex as full-motion video or an interactive application.

The method then proceeds to step 506, where an administrator is able to associate corresponding portions of the graphical element with a position, in accordance with an embodiment of the present invention. In the case of a specific venue, for example, an administrator is able to visualize, through the aid of an overlay, the location within the venue at which each portion of the graphical element will appear. Moreover, the administrative tool allows, in accordance with a further embodiment of the present invention, the visualization of timing effects and the appearance of the complete virtual billboard under certain constraints (e.g., where individual mobile devices are of different form factors, where a number of seats are empty or no mobile device is present at that location, etc.). This allows the administrator to design and select designs based on the composition of the virtual billboard at a particular event.

The method then proceeds to step 508 where the association of data is stored by the system for later playback, in accordance with an embodiment of the present invention. Storage may be facilitated through the use of a database, whereby the database can be utilized to, by way of non-limiting example, associate individual positions in a venue with portions of the graphical element for rapid lookup. The method then ends at step 510.

VI. Example Computer System Implementation

Figure 6:
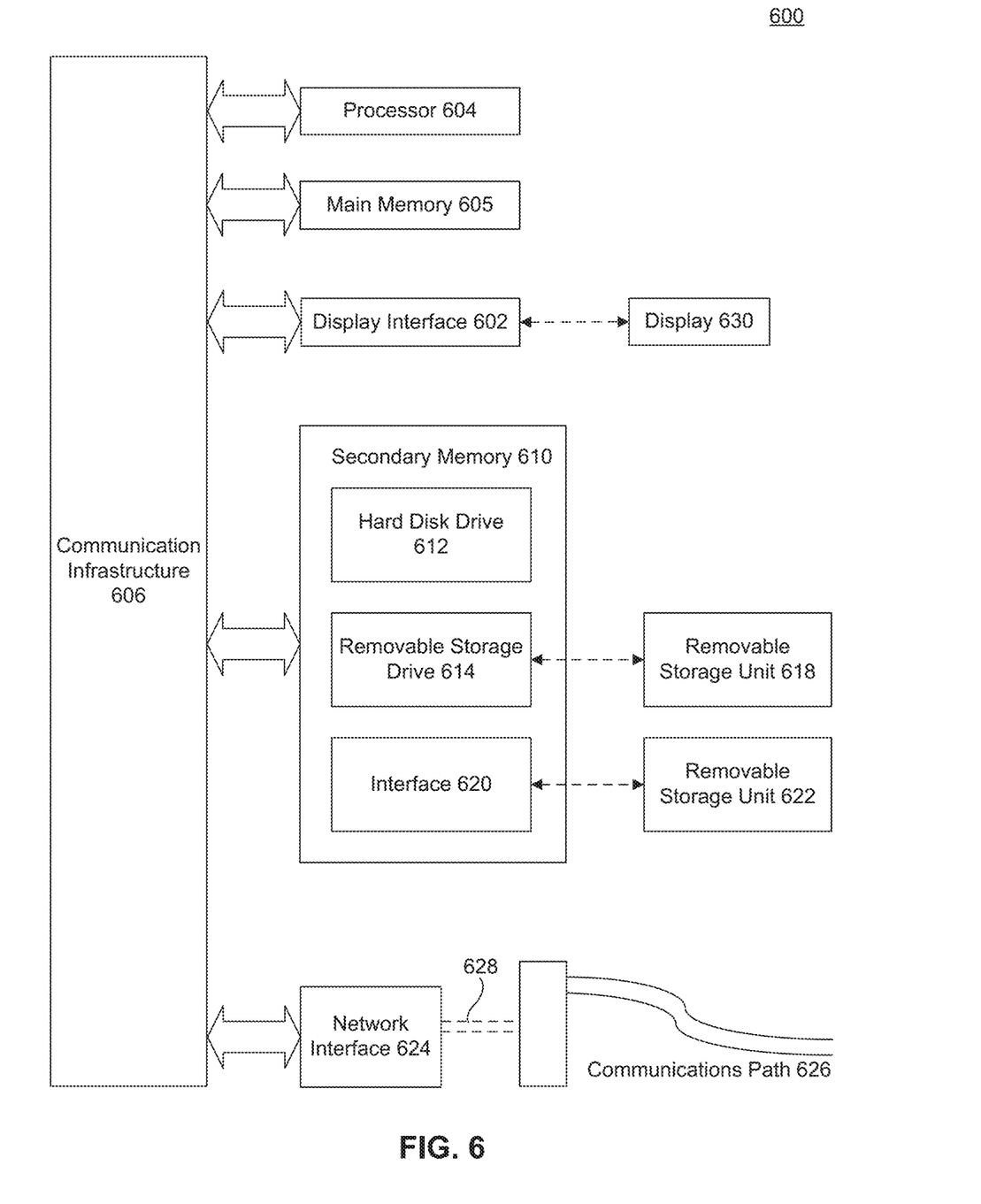
FIG. 6 depicts an example computer system in which embodiments of the present invention may be implemented.

Various aspects of the present invention can be implemented by software, firmware, hardware, or a combination thereof. FIG. 6 illustrates an example computer system 600 in which the present invention, or portions thereof, can be implemented as computer-readable code. For example, the methods illustrated by flowcharts 300 of FIG. 3, 400 of FIG. 4, and 500 of FIG. 5, can be implemented in system 600. Various embodiments of the invention are described in terms of this example computer system 600. After reading this description, it will become apparent to a person skilled in the relevant art how to implement the invention using other computer systems and/or computer architectures.

Computer system 600 includes one or more processors, such as processor 604. Processor 604 can be a special purpose or a general purpose processor. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612, a removable storage drive 614, and/or a memory stick. Removable storage drive 614 may comprise a floppy disk drive, a magnetic tape drive, an optical disk drive, a flash memory, or the like. The removable storage drive 614 reads from and/or writes to a removable storage unit 618 in a well-known manner. Removable storage unit 618 may comprise a floppy disk, magnetic tape, optical disk, etc. that is read by and written to by removable storage drive 614. As will be appreciated by persons skilled in the relevant art(s), removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 that allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals that may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Signals carried over communications path 626 can also embody the logic described herein. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor 604 to implement the processes of the present invention, such as the steps in the methods illustrated by flowcharts 300 of FIG. 3, 400 of FIG. 4, and 500 of FIG. 5, discussed above. Accordingly, such computer programs represent controllers of the computer system 600. Where the invention is implemented using software, the software may be stored in a computer program product and loaded into computer system 600 using removable storage drive 614, interface 620, hard drive 612 or communications interface 624.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VII. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for displaying a virtual billboard at a venue, the method comprising:
   determining a first seat location associated with a first mobile device corresponding to a seat at the venue based on an electronic ticket stored on the first mobile device;
   preloading, on the first mobile device, display data correlated with the first seat location, wherein the display data is preloaded based on a capability of the first mobile device;
   synchronizing the first mobile device and a second mobile device to a common clock; and
   triggering display of the display data by the first mobile device in synchronization with display of additional display data by the second mobile device using the common clock, the first seat location, a second seat location associated with the second mobile device, a first delay introduced based on the first seat location, and a second delay introduced based on the second seat location,
   wherein the triggering is unique to the first mobile device or common to the first mobile device and the second mobile device depending on a graphical element to be displayed by the virtual billboard.

2. The method of claim 1, further comprising:
   providing an administrative interface configured to associate portions of the graphical element with the first seat location and the second seat location within the venue.

3. The method of claim 2, wherein the providing the administrative interface further comprises:
   displaying a visualization of the virtual billboard within the venue.

4. The method of claim 1, wherein the display data comprises a portion of a static graphic, full-motion video, or programmatic graphical display information corresponding to the first seat location.

5. The method of claim 1, further comprising:
   verifying, by an application executing on the first mobile device, the first seat location associated with the first mobile device within the venue.

6. A non-transitory computer-readable storage device having instructions stored thereon, execution of which, by the computing device, cause the computing device to perform operations comprising:
   determining a first seat location associated with a first mobile device corresponding to a seat at a venue based on an electronic ticket stored on the first mobile device;
   preloading, on the first mobile device display data correlated with the first seat location, wherein the display data is preloaded based on a capability of the first mobile device;
   synchronizing the first mobile device and a second mobile device to a common clock; and
   triggering display of the display data by the first mobile device in synchronization with display of additional display data by the second mobile device using the common clock, the first seat location, a second seat location associated with the second mobile device, a first delay introduced based on the first seat location, and a second delay introduced based on the second seat location,
   wherein the triggering is unique to the first mobile device or common to the first mobile device and the second mobile device depending on a graphical element to be displayed by a virtual billboard.

7. The non-transitory computer-readable storage device of claim 6, the operations further comprising:
providing an administrative interface configured to associate portions of the graphical element with the first seat location and the second seat location within the venue.

8. The non-transitory computer-readable storage device of claim 7, wherein the providing the administrative interface further comprises:
displaying a visualization of the virtual billboard within the venue.

9. The non-transitory computer-readable storage device of claim 6, wherein the display data comprises a portion of a static graphic, full-motion video, or programmatic graphical display information corresponding to the first seat location.

10. The non-transitory computer-readable storage device of claim 6, the operations further comprising:
verifying, by an application executing on the first mobile device, the first seat location associated with the first mobile device within the venue.

11. A mobile device configured to display at least a portion of a virtual billboard at a venue, the mobile device comprising:
an electronic ticket stored on the mobile device;
a processor configured to determine a first seat location corresponding to a seat at the venue based on the electronic ticket;
a receiver configured to preload display data correlated with the first seat location, wherein the display data is preloaded based on a capability of the mobile device;
a storage device storing the display data; and
a display configured to display the display data in response to the mobile device detecting a triggering event,
wherein the triggering event triggers display of the display data by the mobile device in synchronization with display of additional display data by a second mobile device using a common clock, the first seat location, a second seat location associated with the second mobile device, a first delay introduced based on the first seat location, and a second delay introduced based on the second seat location, and
wherein the mobile device and the second mobile device are synchronized to the common clock.

12. The mobile device of claim 11, wherein the display data comprises a portion of a static graphic, a portion of a full-motion video, or a portion of programmatic graphical display information corresponding to the first seat location.

13. The mobile device of claim 11, further comprising a graphical user interface configured to receive user input on the mobile device verifying the first seat location.

14. The method of claim 1, wherein the triggering the display of the display data comprises:
displaying the display data at one or more specific times on the common clock.

15. The non-transitory computer-readable storage device of claim 6, wherein the triggering the display of the display data comprises:
displaying the display data at one or more specific times on the common clock.

16. The mobile device of claim 11, wherein the triggering module is further configured to display the display data at one or more specific times on the common clock.

17. The method of claim 1, wherein the capability is a graphical capability and the display data varies based on the graphical capability.

18. The non-transitory computer-readable storage device of claim 6, wherein the capability is a graphical capability and the display data varies based on the graphical capability.

19. The mobile device of claim 11, wherein the capability is a graphical capability and the display data varies based on the graphical capability.

20. The mobile device of claim 11, further comprising:
verifying, by an application executing on the mobile device, the first seat location associated with the mobile device within the venue.

* * * * *

UNITED STATES PATENT AND TRADEMARK OFFICE
CERTIFICATE OF CORRECTION

PATENT NO. : 10,548,139 B1  
APPLICATION NO. : 15/270406  
DATED : January 28, 2020  
INVENTOR(S) : Dolan et al.

Page 1 of 1

It is certified that error appears in the above-identified patent and that said Letters Patent is hereby corrected as shown below:

In the Claims

In Column 10, Claim 6, Line 50, please replace "device" with -- device, -- therefor.

Signed and Sealed this
Eleventh Day of August, 2020

Andrei Iancu
*Director of the United States Patent and Trademark Office*